United States Patent [19]

Okada et al.

[11] 4,384,898
[45] May 24, 1983

[54] PROCESS FOR PRODUCING CYCLODEXTRINS

[75] Inventors: Minoru Okada, Mishima; Masamitsu Matsuzawa, Fuji; Osamu Uezima, Mishima, all of Japan

[73] Assignees: Nihon Shokuhin Kako Co., Ltd.; Rikagaku Kenkyusho, both of Tokyo, Japan

[21] Appl. No.: 285,262

[22] Filed: Jul. 20, 1981

[30] Foreign Application Priority Data

Jul. 31, 1980 [JP] Japan ............................ 55-104383

[51] Int. Cl.³ .................... C13D 3/14; C13K 13/00; C13L 1/10; C12D 13/00
[52] U.S. Cl. ................................. 127/40; 127/38; 127/46.3; 435/95; 435/96; 435/97; 435/98; 435/99; 435/803
[58] Field of Search ............ 127/46.3, 46.2, 40, 127/38; 435/97, 274, 803, 99, 95, 98; 210/672

[56] References Cited

U.S. PATENT DOCUMENTS

| | | | |
|---|---|---|---|
| 2,891,869 | 6/1959 | Langlois | 127/38 X |
| 3,652,398 | 3/1972 | Armbruster et al. | 435/97 |
| 3,785,864 | 1/1974 | Laver et al. | 127/46.2 |
| 4,022,637 | 5/1977 | Sutthoff et al. | 127/46.2 |
| 4,025,357 | 5/1977 | Leiser et al. | 127/46.2 |
| 4,133,696 | 1/1979 | Barker et al. | 127/46.2 |
| 4,135,977 | 1/1979 | Horikoshi et al. | 435/97 |

*Primary Examiner*—Kenneth M. Schor
*Attorney, Agent, or Firm*—Bucknam and Archer

[57] ABSTRACT

This invention relates to a process for producing cyclodextrins, which comprises passing a solution containing cyclodextrins and reducing sugars as primary ingredients through a column packed with alkali or alkali earth metal salts of strongly acidic cation exchange resin to separate and collect cyclodextrins from the sugar solution.

8 Claims, 1 Drawing Figure

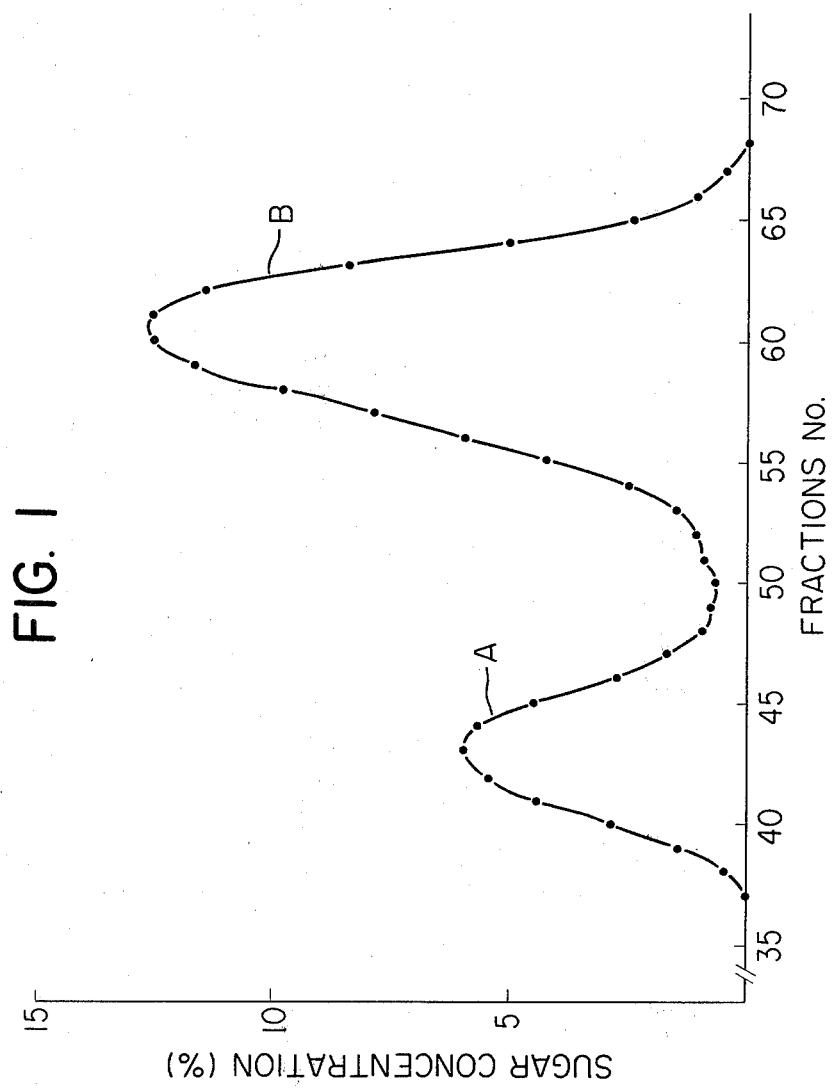

PROCESS FOR PRODUCING CYCLODEXTRINS

BACKGROUND OF THE INVENTION

1. Field of the Invention

This invention relates to a novel process for producing cyclodextrins and more particularly, to a process for producing cyclodextrins without using any organic solvents, which comprises passing a solution containing cyclodextrins and reducing sugars as primary ingredients through a column packed with alkali or alkali earth metal salts of strongly acidic cation exchange resin to separate and collect cyclodextrins from the sugar solution.

2. Description of the Prior Art

Cyclodextrins are non-reducing dextrins which have a ring structure wherein glucose units are joined to one another by $\alpha$-1,4-glucosidic linkages. Generally, $\alpha$-cyclodextrin, $\beta$-cyclodextrin and $\gamma$-cyclodextrin, which consist of 6, 7 and 8 glucose units, respectively, are well known. The cyclodextrin molecule includes various kinds of organic compounds into the cavity of the ring structure which is in a hydrophobic atmosphere to form an inclusion compound. Alpha-, beta- and gamma-cyclodextrins have many different physical properties from one another: the molecular weights ($\alpha=973$, $\beta=1135$ and $\gamma=1297$), the cavity diameters of ring structure ($\alpha=5$-$6$ Å, $\beta=7$-$8$ Å and $\gamma=9$-$10$ Å) and water solubility (at 25° C., g/100 ml.H$_2$O: $\alpha=14.5$, $\beta=1.85$ and $\gamma=23.2$).

Accordingly, cyclodextrins find wise use in medicines, agricultural chemicals, cosmetics and foods and new applications thereof are expected to be found. Only a mixture of $\alpha$-, $\beta$- and $\gamma$-cyclodextrins and starch hydrolyzate containing acyclic dextrins, and, $\beta$-cyclodextrin precipitated and separated from such mixture, are products which can be produced, at present, at relatively low cost. Alpha-cyclodextrin and $\gamma$-cyclodextrin cannot be produced at low cost. The industrial production of $\alpha$- and $\gamma$-cyclodextrins is deemed difficult, although they have special properties and their specific applications are expected as described above. This is due to the difference of water solubility of $\alpha$-, $\beta$- and $\gamma$-cyclodextrins. Namely, the water-solubility of $\beta$-cyclodextrin is very low compared with $\alpha$- and $\gamma$-cyclodextrins and therefore, it is easily precipitated and separated from the starch hydrolyzate solution containing cyclodextrins. On the contrary, $\alpha$- and $\gamma$-cyclodextrins have relatively high water solubilities and so, it is difficult without using any organic solvents to separate these cyclodextrins as crystal from the starch hydrolyzate solution containing cyclodextrins.

There are many proposed processes for producing cyclodextrins hereinbefore. One typical process is such that liquefied starch products are reacted with cyclodextrin glycosyltransferase, hereinafter refer to "CGTase," to obtain starch hydrolyzate solution containing cyclodextrins followed by adding an organic solvent such as trichloroethylene, tetrachloroethane or bromobenzene to precipitate cyclodextrins as a complex and to separate cyclodextrins from the starch hydrolyzate.

An improved process of the typical one mentioned above has been proposed, which comprises reacting the starch hydrolyzate containing cyclodextrins with glucoamylase in order to hydrolyse acyclic dextrins to convert them into glucose and then adding an organic solvent to the resulting sugar solution containing cyclodextrins and glucose to precipitate only cyclodextrins (see DENPUN-KAGAKU (Starch Science) 22, pp. 6–10 (1975): Japanese Pat. No. 1,034,493).

However, organic solvents are used to precipitate cyclodextrins in all the aforementioned processes and contaminate the cyclodextrins thus obtained so that they cannot be utilized in the production of medicines or foods due to the toxicity of the solvents and the production cost should have been high.

Some processes for producing cyclodextrins without using any organic solvents, that is, non-solvent processes have recently been discussed and proposed. There are proposed two non-solvent processes, that is, the one comprising reacting liquefied starch with a new CGTase having an optimum pH on the alkaline side instead of known CGTases, concentrating the reaction mixture and adding a small amount of cyclodextrin as a seed crystal to precipitate cyclodextrins (see Japanese Pat. No. 914,137) and the other comprising contacting a solution containing cyclodextrins and reducing sugars with OH type of anion exchange resin to adsorb only reducing sugars on the resin to thereby separate cyclodextrins from the reducing sugars (see Japanese Pat. No. 136,889/1976).

These non-solvent processes are advantageous since cyclodextrins obtained by the processes have no toxicity of the solvents so that they can widely be used in the field of medicines or foods. However, these processes have some disadvantages: the former process requires complicated operations and the latter process therein OH type of anion exchange resin is used is not sufficient to effectively and continuously produce cyclodextrins because elution rate of reducing sugars adsorbed on the resin is too low and, if HCl is used to increase the elution rate, a regeneration of the resin after HCl elution is required and further, a temperature of liquid passing through the column packed with the resin should be controlled below 20° C. in order to prevent reducing sugars adsorbed from decomposing. In addition, the aforementioned non-solvent processes are those for producing $\beta$-cyclodextrin or a mixture of $\alpha$-, $\beta$- and $\gamma$-cyclodextrins but are not those for selectively separating $\alpha$-cyclodextrin or $\gamma$-cyclodextrin.

As it is well known, cyclodextrins (in particular, $\alpha$-cyclodextrin) which have special molecular structure and properties and from which possible utilization in a wide field is expected, may extremely be useful in view of an industrial and an economic points, if such cyclodextrins could be produced advantageously without using any organic solvents.

SUMMARY OF THE INVENTION

Accordingly, an object of this invention is to provide a process for producing cyclodextrins by non-solvent process at high efficiency.

Another object of this invention is to provide a process for producing $\alpha$-cyclodextrin by non-solvent process.

The inventors have studied the matter to accomplish the objects and found that cyclodextrins is efficiently separated from reducing sugars and is continuously produced by a process comprising passing a sugar solution containing cyclodextrins and reducing sugars as primary ingredients through a column packed with alkali or alkali earth metal salts of strongly acidic cation exchange resin and further, that only $\alpha$-cyclodextrin is selectively and efficiently produced by the same process except that the sugar solution is reacted with a specific saccharogenic enzyme prior to passing the solution through the column to hydrolyze cyclodextrins except for α-cyclodextrin into reducing sugars.

This invention has been completed under the discoveries mentioned above.

According to the present invention there is provided a process for producing cyclodextrins comprising passing a sugar solution containing cyclodextrins and reducing sugars as primary ingredients through a column packed with alkali or alkali earth metal salts of strongly acidic cation exchange resin to separate and collect cyclodextrins from reducing sugars.

According to the present invention there is provided a process for producing α-cyclodextrin comprising passing a sugar solution containing α-cyclodextrin and reducing sugars as primary ingredients through a column packed with alkali or alkali earth metal salts of strongly acidic cation exchange resin to separate and collect α-cyclodextrin from reducing sugars.

A separation mechanism of cyclodextrins or α-cyclodextrin from reducing sugars according to the present invention is different from that of a conventional adsorption chromatography using OH type of anion exchange resin. In the adsorption chromatography, reducing sugars are strongly adsorbed on exchange radical of anion resin. On the other hand, the separation process of the present invention is a kind of gel chromatography depending upon the difference between molecular weights of cyclodextrins and reducing sugars.

BRIEF DESCRIPTION OF THE DRAWING

FIG. 1 shows an elution pattern according to the present invention, which was obtained when the sugar solution containing α-, β- and γ-cyclodextrins and reducing sugars (comprising a larger amount of glucose and a smaller amount of oligosaccharides) was fed to the column packed with strongly acidic cation exchange resin (DIAION-SK-IBS, Na type) after which it was eluted with water at 60° C.

In FIG. 1, A and B represent fractions of cyclodextrins (a mixture of α-, β- and γ-cyclodextrins) and glucose, respectively.

DESCRIPTION OF THE PREFERRED EMBODIMENTS

The processes of the present invention will now be described in detail.

A sugar solution containing cyclodextrins and reducing sugars such as glucose and maltose as primary ingredients is employed as starting material in the present invention and may be prepared, for example, by the following process. Starch hydrolyzate containing cyclodextrins may be prepared by reacting CGTase with a gelatinized starch solution prepared by heating a suspension containing 2 to 40% of starch with stirring, or with a liquefied starch solution prepared by adding a liquefying enzyme such as α-amylase to the starch suspension and heating the mixture. Examples of starch material include corn, wheat, potato and tapioca starches and grain flour containing such starches. CGTase used includes known enzymes obtained from Bacillus sp. such as *Bacillus macerans* (IFO-3490, IAM-1227), *Bacillus circulans* (ATCC 61, ATCC 9966), alkalophilic Bacillas sp. (BIKOKEN No. 614 and 612) and *Bacillus megaterium* (FERM-P No. 935). Working condition may be suitably determined depending on the optimum pH and the optimum temperature for a specific enzyme.

The starch hydrolyzate solution containing cyclodextrins dextrins thus obtained or a filtrate prepared by removing crystalline β-cyclodextrin from the hydrolyzate solution are then reacted with a saccharogenic enzyme to obtain a sugar solution containing cyclodextrins and reducing sugars such as glucose and maltose. The saccharogenic enzyme used may be suitably selected depending on the intended product. If the product in which α-, β- and γ-cyclodextrins coexist is intended, such a saccharogenic enzyme, that hydrolyzes straight or branched chain dextrins to convert them into reducing sugars such as glucose and maltose but does not substantially hydrolyze any of α-, β- and γ-cyclodextrins, is used to obtain a sugar solution containing α-, β- and γ-cyclodextrins and reducing sugars. Examples of such saccharogenic enzyme include glucoamylase, β-amylase and combination of either of them and α-1,6-glucosidase. Glucoamylase or α-1,6-glucosidase combined with glucoamylase hydrolyze straight or branched chain dextrins to convert them into glucose. β-Amylase or α-1,6-glucosidase combined with β-amylase convert the dextrins into maltose. On the other hand, if α-cyclodextrin is intended, a saccharogenic enzyme which can not substantially hydrolyze α-cyclodextrin but can hydrolyze cyclodextrins such as β- and γ-cyclodextrins and the remaining acyclic dextrins to convert them into reducing sugars such as glucose and maltose, is used. Examples of such saccharogenic enzyme include bacterial saccharogenic α-amylase, fungal α-amylase and glucoamylase combined with these α-amylases. Bacterial saccharogenic α-amylase or fungal α-amylase convert the starch hydrolyzate other than α-cyclodextrin to mainly glucose and maltose. Glucoamylase combined with bacterial saccharogenic α-amylase converts the starch hydrolyzate into glucose. Reducing sugars contained in the sugar solution is preferably converted into glucose in the light of efficiency of a succeeding separation step in the processes of the present invention.

In the present invention, the resulting sugar solution containing cyclodextrins and reducing sugars as primary ingredients is passed through the column packed with strongly acidic cation exchange resin to fractionate cyclodextrins from the sugar solution. Various strongly acidic cation exchange resins are commercially available and may be used. Typically, alkali or alkali earth metal salts of strongly acidic cation exchange resin may be used which comprise cross-linked styrene-divinylbenzene copolymer having sulfonyl groups. Examples of commercially available resin include DIAION-SK-series such as IB, IAG, 100, 102, 104, 106, 110, 112 and 116 (Mitsubishi Chemical. Ind. Ltd., JAPAN), AMBERLITE-IR-series such as 120B, 12T, 116, 118, 122 and 124 (Rohm & Haas Co., USA) and DOWEX-50W (Dow Chemical Co.). The smaller the particle size of resin, the better is the separation of cyclodextrins from reducing sugars. Too fine particles result in an increase in water pressure loss while passing a solution through the column packed with such resin. Accordingly, the particle size is in the range of 20 to 200 mesh, preferably 30 to 100 mesh. A higher temperature at which fractionation is preformed leads to a good separation, however, the temperature is preferably in the range of 50° to 80° C. in consideration of sugar decomposition or resin life. Below 50° C., the efficiency of separation is not satisfactory and an undesirable infection of microorganisms may occur and above 80° C., sugar decomposition occurs and the resin life becomes short.

A pH of a sugar solution to be passed through may be in the range of 3 to 6 which a typical sugar solution shows. A concentration of the sugar solution is less than 60%, preferably in the range of 20 to 50%. The sugar solution is passed through the column from the top at a space velocity (SV) of 0.1 to 1.0. The effluent, that is, 50° to 80° C. water is then passed through the column to perform the fractionation. It is noted that water having an ambient temperature may be used as the effluent because such water can be heated to the desired temperature due to the heated column which is typically kept at about 60° C. The process by which a liquid is passed through the column is suitably selected from, for example, fixed bed, moving bed or false moving bed processes.

The following illustrates an example of the fractional chromatography by which cyclodextrins are separated from reducing sugars according to the present invention. 15 Ml of sugar solution containing 23.5% of solid (which consists of 2.8% of $\alpha$-cyclodextrin, 7.1% of $\beta$-cyclodextrin, 11.2% of $\gamma$-cyclodextrin, 77.4% of glucose and 1.5% of oligosaccharides) was fed to a column having an internal diameter of 2.6 cm and a height of 70 cm and packed with 320 ml of strongly acidic cation exchange resin (DIAION-SK-IBS, Na type) after which, the eluting water of 60° C. was passed through the column at SV=0.45. The effluent liquid was collected in successive fractions of 5 g, each of which were then analyzed. This is illustrated graphicyally in FIG. 1 wherein cyclodextrins and reducing sugars fractions are represented by A and B, respectively and the two fractions are advantageously separated.

According to the process of the present invention as mentioned above, high pure cyclodextrins can be obtained and further, reducing sugars can be easily eluted so that feeding the sugar solution and succeeding elution with water can continuously be repeated, which leads to the production of cyclodextrins in a high efficiency.

The present invention will now be described with reference to the following Examples.

EXAMPLE 1

240 Grams of potato starch was suspended in 1.4 liter of water. To the suspension, 8 mg of calcium chloride and CGTase produced by alkalophilic, Bacillus sp. No. 38-2 (ATCC 21783, BIKOKEN No. 614) in an amount of 50 units per one gram of starch were added and the mixture was heated at 80° C. for 30 minutes and was liquefied. The liquefied starch was then heated at 120° C. for 10 minutes in an autoclave to inactivate the enzyme. After cooling the resulting liquefied solution, the CGTase mentioned above was added to the solution in an amount of 100 units per one gram of starch and the mixture was reacted at pH 7.5 for 40 hours at 65° C. The resulting solution was heated to inactivate the enzyme and then, glucoamylase (3,400 IU/g) produced by *Rhizopus niveus* was added to the solution in an amount of 0.1% by weight of the solids content and the mixture was reacted at pH 5.0 for 30 hours at 55° C. The reaction mixture was purified by the conventional method and concentrated, 45 g of crystalline $\beta$-cyclodextrin was removed and 445 g of 42% sugar solution containing glucose and cyclodextrins as primary ingredients was obtained. The solids of the sugar solution consists of 77.5% of glucose, 1.5% of oligosaccharides and 21% of cyclodextrins ($\alpha:\beta:\gamma=2.8:7.1:11.2$).

38 Grams of the resulting sugar solution was fed to a column having an internal diameter of 2.5 cm and a height of 120 cm and packed with 500 ml of strongly acidic cation exchange resin (DIAION-SK-IBS, Na type) at SV=0.28 at 60° C. and then, water was passed through the column. Fractions of 69 g of 4.7% of cyclodextrins solution and 165 g of 7.5% glucose solution were obtained. The cyclodextrins fraction was concentrated to dryness to obtain 3.1 g of a mixed powder of $\alpha$, $\beta$- and $\gamma$-cyclodextrins. The yield of cyclodextrins was 92.5% and a purity thereof was 98.5%.

EXAMPLE 2

120 Grams of potato starch was suspended in 2 liter of water and 10 mg of calcium chloride was added to the suspension.

The reaction mixture was heated at 120° C. for 30 minutes in an autoclave to obtain a gelatinized starch solution. CGTase produced by *Bacillus macerans* (IFO 3490) was added to the resulting gelatinized solution in an amount of 150 units per one gram of starch and the mixture was reacted at pH 6.0 for 40 hours at 40° C. The resulting solution was heated to inactivate the enzyme. Glucoamylase (3,400 IU/g) produced by *Rhizopus niveus* and bacterial saccharogenic $\alpha$-amylase (10,000 U/g) were added to the solution in an amount of 0.1% and 0.2% by weight of the solids content, respectively and the mixture was reacted at pH 5.0 for 30 hours at 40° C. The reaction mixture was then purified and concentrated, 28% sugar solution containing $\alpha$-cyclodextrin and glucose as primary ingredients was obtained. The solids of the sugar solution consists of 74.2% of glucose, 24.3% of $\alpha$-cyclodextrin and 1.5% of oligosaccharides.

50 Grams of the resulting sugar solution was fed to a column having an internal diameter of 2.5 cm and a height of 120 cm and packed with 500 ml of strongly acidic cation exchange resin (AMBERLITE-CG-120I, Na type, the product of Rohm & Haas Co., Ltd.) at SV=0.45 at 60° C. and then, water passed through the column. Fractions of 75 g of 4.3% $\alpha$-cyclodextrin solution and 131 g of 8% glucose solution were obtained. The $\alpha$-cyclodextrin fraction was concentrated and $\alpha$-cyclodextrin was crystalllized, filtered and dried, 2.2 g of crystalline $\alpha$-cyclodextrin was obtained. A purity of the product was 99.8%.

EXAMPLE 3

The sugar solution obtained in Example 2 and containing $\alpha$-cyclodextrin and glucose as primary ingredients was adjusted to a concentration of 30%. 45 Grams of the resulting sugar solution was fed to a column having an internal diameter of 2.2 cm and a height of 150 cm and packed with 500 ml of strongly acidic cation exchange resin (DIAION-SK-IBS, Ca type) at SV=0.6 at 60° C. and then, fractionation was performed according to the procedure as described in Example 2, 55 g of 5.5% $\alpha$-cyclodextrin solution was obtained. The yield and purity of the product were 92.2% and 97.8%, respectively.

What we claim is:

1. A process for the production and recovery of cyclodextrins which consists of the steps of:
   (a) reacting gelatinized or liquefied starch with cyclodextrin glycosyltransferase to prepare a mixture containing cyclodextrins and acyclic dextrins;

(b) reacting said mixture from step (a) with a saccharogenic enzyme capable of hydrolyzing said acyclic dextrins and having substantially no hydrolytic action on said cyclodextrins, to convert said acyclic dextrins into reducing sugars, whereby a sugar solution containing cyclodextrins and reducing sugars as primary components is obtained;

(c) passing said sugar solution from step (b) through a column packed with an alkali or an alkaline earth metal salt of a strongly acidic cation exchange resin; and (d) eluting the cyclodextrins from the column with water to recover them.

2. The process according to claim 1, wherein said saccharogenic enzyme is selected from the group consisting of glucoamylase, $\beta$-amylase, a mixture of $\alpha$-1,6-glucosidase with glucoamylase, and a mixture of $\alpha$-1,6-glucosidase with $\beta$-amylase.

3. The process according to claim 1, wherein said strongly acidic cation exchange resin is a cross-linked styrene-divinylbenzene copolymer having sulfonyl groups.

4. A process for the production and recovery of $\alpha$-cyclodextrin which consists of the steps of:

(a) reacting gelatinized or liquefied starch with cyclodextrin glycosyltransferase to prepare a mixture containing $\alpha$, $\beta$ and $\gamma$-cyclodextrins and acyclic dextrins;

(b) reacting the mixture from step (a) with a saccharogenic enzyme capable of hydrolyzing said acyclic dextrins, $\gamma$-cyclodextrin and $\beta$-cyclodextrin, said enzyme having substantially no hydrolytic action on $\alpha$-cyclodextrin, whereby said $\gamma$-cyclodextrin and $\beta$-cyclodextrin and said acyclic dextrins are converted into reducing sugars, and a sugar solution is obtained containing $\alpha$-cyclodextrin and reducing sugars as primary ingredients;

(c) passing the sugar solution from step (b) through a column packed with an alkali or an alkaline earth metal salt of a strongly acidic cation exchange resin; and (d) eluting $\alpha$-cyclodextrin with water from the column to recover it.

5. The process according to claim 4, wherein said saccharogenic enzyme is selected from the group consisting of bacterial saccharogenic $\alpha$-amylase, fungal $\alpha$-amylase, a mixture of bacterial saccharogenic $\alpha$-amylase with glucoamylase, and a mixture of fungal $\alpha$-amylase with glucoamylase.

6. The process according to claim 4, wherein said strongly acidic cation exchange resin is a cross-linked styrene-divinylbenzene copolymer having sulfonyl groups.

7. The process according to claim 1, wherein the particle size of the resin is 20–200 mesh and said step (c) is carried out at a temperature of 50°–80° C., and pH of 3–6.

8. The process according to claim 4, wherein the particle size of the resin is 20–200 mesh and said step (c) is carried out at a temperature of 50°–80° C., and pH of 3–6.

* * * * *